US011247686B2

United States Patent
Ienaga et al.

(10) Patent No.: US 11,247,686 B2
(45) Date of Patent: Feb. 15, 2022

(54) ROAD SURFACE FRICTION COEFFICIENT ESTIMATION APPARATUS FOR VEHICLE AND ROAD SURFACE FRICTION COEFFICIENT ESTIMATION METHOD FOR VEHICLE

(71) Applicant: SUBARU CORPORATION, Tokyo (JP)

(72) Inventors: Hiroshi Ienaga, Tokyo (JP); Shinichi Sakaguchi, Tokyo (JP); Takahiro Kobayashi, Tokyo (JP); Takeshi Yoneda, Tokyo (JP); Junya Ogasahara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 96 days.

(21) Appl. No.: 15/951,014

(22) Filed: Apr. 11, 2018

(65) Prior Publication Data

US 2019/0001988 A1 Jan. 3, 2019

(30) Foreign Application Priority Data

Jun. 28, 2017 (JP) .............................. JP2017-126390

(51) Int. Cl.
*B60W 40/068* (2012.01)
*B60W 10/14* (2012.01)
(Continued)

(52) U.S. Cl.
CPC ....... *B60W 40/068* (2013.01); *B60G 17/0165* (2013.01); *B60T 8/172* (2013.01);
(Continued)

(58) Field of Classification Search
CPC .. B60W 40/068; B60W 10/14; B60W 40/064; B60W 2552/40; B60W 2556/45;
(Continued)

(56) References Cited

U.S. PATENT DOCUMENTS 9,643,617 B2 * 5/2017 Fischer ................ B60T 8/1725
10,814,846 B2 * 10/2020 Falconer ................ B60T 8/175
(Continued)

FOREIGN PATENT DOCUMENTS

JP 2005-028887 A 2/2005

OTHER PUBLICATIONS

Japanese Office Action, dated Apr. 16, 2019, in Japanese Application No. 2017-126390 and English Translation thereof.

*Primary Examiner* — Aniss Chad
*Assistant Examiner* — Chase L Cooley
(74) *Attorney, Agent, or Firm* — McGinn IP Law Group, PLLC (57) ABSTRACT

A road surface friction coefficient estimation apparatus for a vehicle includes: a first estimator; a second estimator; and a third estimator. The first estimator estimates a first road surface friction coefficient on a basis of a vehicle information acquired from the vehicle. The second estimator estimates a second road surface friction coefficient on a basis of an external information acquired from an outside of the vehicle. The third estimator estimates a road surface friction coefficient from the first road surface friction coefficient and the second road surface friction coefficient on a basis of a first reliability degree and a second reliability degree, the first reliability degree indicating a reliability of the first road surface friction coefficient, the second reliability degree indicating a reliability of the second road surface friction coefficient.

20 Claims, 4 Drawing Sheets

(51) Int. Cl.
  *B60W 40/064*   (2012.01)
  *G08G 1/0967*   (2006.01)
  *B60T 8/172*    (2006.01)
  *B60G 17/0165*  (2006.01)

(52) U.S. Cl.
  CPC .......... *B60W 10/14* (2013.01); *B60W 40/064* (2013.01); *G08G 1/09675* (2013.01); *G08G 1/096716* (2013.01); *G08G 1/096775* (2013.01); *G08G 1/096783* (2013.01); *G08G 1/096791* (2013.01); *B60G 2400/822* (2013.01); *B60G 2800/702* (2013.01); *B60T 2210/12* (2013.01); *B60T 2270/413* (2013.01); *B60W 2552/40* (2020.02)

(58) Field of Classification Search
  CPC ......... B60W 2556/50; B60W 2520/28; B60W 2510/0657; B60W 2520/105; B60W 2520/14; B60W 2520/125; B60W 2540/18; B60W 2510/083; B60W 2555/20; G08G 1/096775; G08G 1/096791; G08G 1/096716; G08G 1/096783; G08G 1/09675; B60G 17/0165; B60G 2400/822; B60G 2800/702; B60T 8/172; B60T 2270/413; B60T 2210/12
  See application file for complete search history.

(56)   References Cited

U.S. PATENT DOCUMENTS

| | | | |
|---|---|---|---|
| 2001/0045891 A1* | 11/2001 | Nakao | G08G 1/096716 340/426.1 |
| 2002/0072841 A1* | 6/2002 | Kogure | B60W 40/064 701/80 |
| 2005/0010350 A1 | 1/2005 | Hiwatashi | |
| 2018/0126998 A1* | 5/2018 | Offenhaeuser | B60W 40/068 |

* cited by examiner

FIG. 2

■ VEHICLE INFORMATION

| ACCELERATION | SMALL | ⇔ | LARGE |
|---|---|---|---|
| RELIABILITY DEGREE | LOW | ⇔ | HIGH |

| DECELERATION | SMALL | ⇔ | LARGE |
|---|---|---|---|
| RELIABILITY DEGREE | LOW | ⇔ | HIGH |

| STEERING WHEEL ANGLE | SMALL | ⇔ | LARGE |
|---|---|---|---|
| RELIABILITY DEGREE | LOW | ⇔ | HIGH |

FIG. 3

■ EXTERNAL INFORMATION

ANOTHER VEHICLE

| WHEEL DRIVE TYPE | AWD | ⇔ | FWD, RWD |
|---|---|---|---|
| RELIABILITY DEGREE | LOW | ⇔ | HIGH |

| P/U | E/G | ⇔ | ELECTRIC VEHICLE |
|---|---|---|---|
| RELIABILITY DEGREE | LOW | ⇔ | HIGH |

| TIME | FEW DAYS BEFORE | ⇔ | IMMEDIATELY BEFORE |
|---|---|---|---|
| RELIABILITY DEGREE | LOW | ⇔ | HIGH |

INFRASTRUCTURE

| WEATHER | ONLY TEMPERATURE | ⇔ | CAMERA INFORMATION |
|---|---|---|---|
| RELIABILITY DEGREE | LOW | ⇔ | HIGH |

ROAD SURFACE FRICTION COEFFICIENT ESTIMATION APPARATUS FOR VEHICLE AND ROAD SURFACE FRICTION COEFFICIENT ESTIMATION METHOD FOR VEHICLE

CROSS-REFERENCE TO RELATED APPLICATIONS

The present application claims priority from Japanese Patent Application No. 2017-126390 filed on Jun. 28, 2017, the entire contents of which are hereby incorporated by reference.

BACKGROUND

1. Technical Field

The present invention relates to a road surface friction coefficient estimation apparatus for a vehicle and a road surface friction coefficient estimation method for a vehicle.

2. Related Art

For instance, Japanese Unexamined Patent Application Publication (JP-A) No. 2005-28887 below describes that the use of an initial value having high reliability improves the estimation accuracy of a road surface friction coefficient when the road surface friction coefficient is autonomously estimated.

SUMMARY OF THE INVENTION

An aspect of the present invention provides a road surface friction coefficient estimation apparatus for a vehicle. The road surface friction coefficient estimation apparatus includes: a first estimator configured to estimate a first road surface friction coefficient on a basis of a vehicle information acquired from the vehicle; a second estimator configured to estimate a second road surface friction coefficient on a basis of an external information acquired from an outside of the vehicle; and a third estimator configured to estimate a road surface friction coefficient from the first road surface friction coefficient and the second road surface friction coefficient on a basis of a first reliability degree and a second reliability degree. The first reliability degree indicates a reliability of the first road surface friction coefficient. The second reliability degree indicates a reliability of the second road surface friction coefficient.

An aspect of the present invention provides a road surface friction coefficient estimation method for a vehicle. the road surface friction coefficient estimation method includes: estimating a first road surface friction coefficient on a basis of a vehicle information acquired from the vehicle; estimating a second road surface friction coefficient on a basis of an external information acquired from an outside of the vehicle; and estimating a road surface friction coefficient from the first road surface friction coefficient and the second road surface friction coefficient on a basis of a first reliability degree and a second reliability degree. The first reliability degree indicates a reliability of the first road surface friction coefficient. The second reliability degree indicates a reliability of the second road surface friction coefficient.

An aspect of the present invention provides a road surface friction coefficient estimation apparatus for a vehicle. The road surface friction coefficient estimation apparatus includes circuitry. The circuitry is configured to estimate a first road surface friction coefficient on a basis of a vehicle information acquired from the vehicle. The circuitry is configured to estimate a second road surface friction coefficient on a basis of an external information acquired from an outside of the vehicle. The circuitry is configured to estimate a road surface friction coefficient from the first road surface friction coefficient and the second road surface friction coefficient on a basis of a first reliability degree and a second reliability degree. The first reliability degree indicates a reliability of the first road surface friction coefficient. The second reliability degree indicates a reliability of the second road surface friction coefficient.

DETAILED DESCRIPTION

Hereinafter, preferred examples of the present invention will be described in detail with reference to the appended drawings. Note that sizes, materials, specific values, and any other factors illustrated in respective examples are illustrative for easier understanding of the present invention, and are not intended to limit the scope of the present invention unless otherwise specifically stated. Further, elements in the following examples which are not recited in a most-generic independent claim of the disclosure are optional and may be provided on an as-needed basis. The drawings are schematic and are not intended to be drawn to scale. In this specification and the appended drawings, structural elements that have substantially the same function and structure are denoted with the same reference numerals, and repeated description of these structural elements is omitted. Further, elements that are not directly related to the technology are unillustrated in the drawings.

When a road surface friction coefficient is estimated from a parameter indicating a driving state of a vehicle of interest, it may be difficult to estimate the road surface friction coefficient with accuracy in steady driving, in which the vehicle, for instance, moves straight at constant speed.

It is desirable to provide a novel and improved road surface friction coefficient estimation apparatus for a vehicle and a novel and improved road surface friction coefficient estimation method for a vehicle each of which is capable of estimating a road surface friction coefficient with accuracy.

Figure 1:
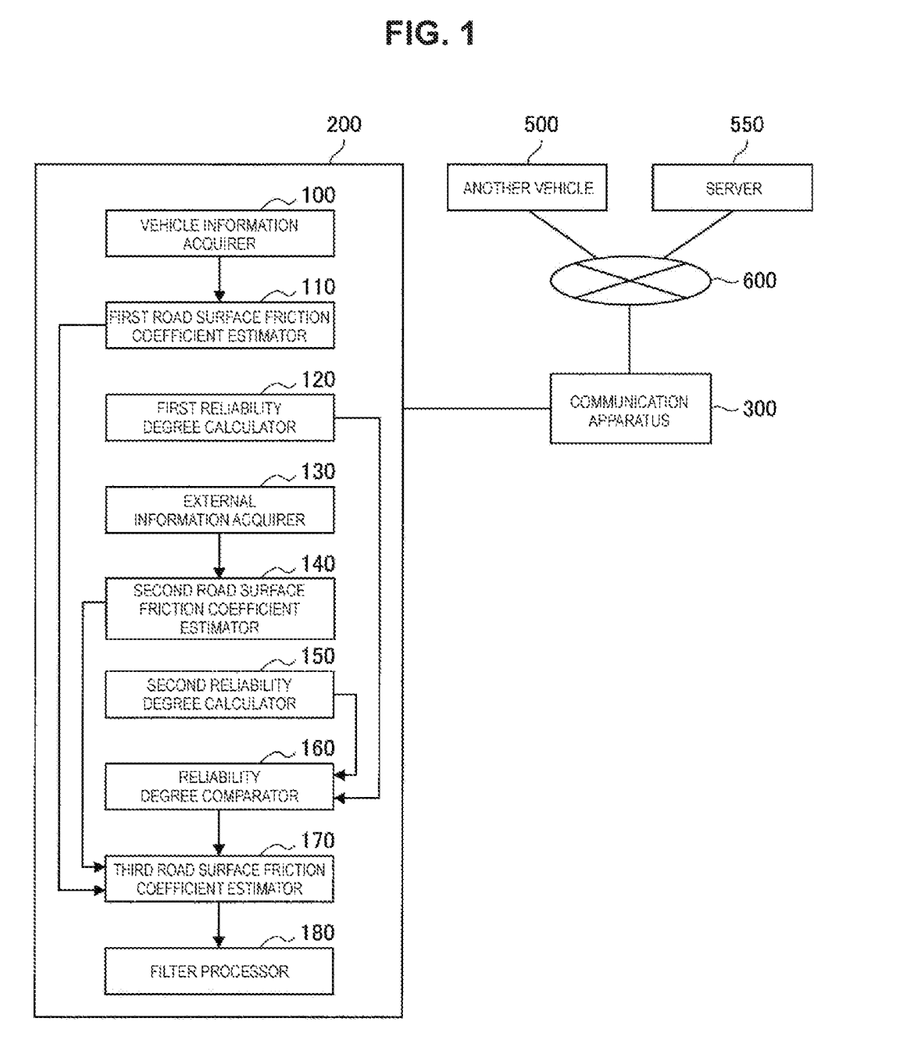
FIG. 1 schematically illustrates a component of a road surface friction coefficient estimation apparatus according to an example of the present invention.

FIG. 1 schematically illustrates a road surface friction coefficient estimation apparatus 200 according to an example of the present invention, and peripheral components thereof. The road surface friction coefficient estimation apparatus 200 is mounted on a vehicle. The road surface friction coefficient estimation apparatus 200 acquires, from the outside of the vehicle, external information regarding a road condition in which the vehicle is going to travel in the future, and estimates a road surface friction coefficient on the basis of the external information. In addition, the road surface friction coefficient estimation apparatus 200 estimates a road surface friction coefficient based on information of the vehicle. The road surface friction coefficient estimation apparatus 200 then evaluates the reliability degrees of both of the estimated road surface friction coefficients, and adopts the information having a higher reliability degree as an estimation result of the final road surface friction coefficient.

As illustrated in FIG. 1, the road surface friction coefficient estimation apparatus 200 includes a vehicle information acquirer 100, a first road surface friction coefficient estimator 110, a first reliability degree calculator 120, an external information acquirer 130, a second road surface friction coefficient estimator 140, a second reliability degree calculator 150, a reliability degree comparator 160, a third road surface friction coefficient estimator 170, and a filter processor 180. Note that each of the components of the road surface friction coefficient estimation apparatus 200 illustrated in FIG. 1 can include a circuit (hardware) or a central processing unit such as a CPU, and a program (software) for bringing it into operation.

The road surface friction coefficient estimation apparatus 200 is coupled to a communication apparatus 300 mounted on the vehicle. The communication apparatus 300 wirelessly communicates with an external vehicle (another vehicle) 500, a server 550 that provides various kinds of information, and the like. The communication apparatus 300 may communicate with the vehicle 500 and the server 550 via a network 600 such as the Internet. The communication apparatus 300 receives external information from the external vehicle 500, the server 550 that provides various kinds of information, or the like.

The vehicle information acquirer 100 acquires vehicle information necessary to estimate a road surface friction coefficient (road surface μ). Examples of the vehicle information include wheel speed, vehicle acceleration, information (steering angle θ) regarding a power steering, a yaw rate, and vehicle driving force (torque of an engine, a motor, or the like).

The first road surface friction coefficient estimator 110 estimates the first road surface friction coefficient on the basis of the vehicle information acquired by the vehicle information acquirer 100. The first road surface friction coefficient estimator 110 uses, for instance, the technique described in JP-A No. 2005-28887 mentioned above to estimate the first road surface friction coefficient. That is, the first road surface friction coefficient estimator 110 uses the detected values of vehicle speed V, a steering angle θ, and a yaw rate γ to calculate parameters (specifications) on the basis of the vehicle's equations of motion. Specifically, variable parameters are estimated by expressing the vehicle's equations of motion with state variables and setting a parameter tuning rule to develop an adaptive control theory. Cornering powers Kf and Kr of the front and rear wheels are then calculated on the basis of these estimated parameters, and the first road surface friction coefficient is estimated on the basis of these cornering powers Kf and Kr. Note that the method of estimating the first road surface friction coefficient is not limited to this method.

Figure 2:
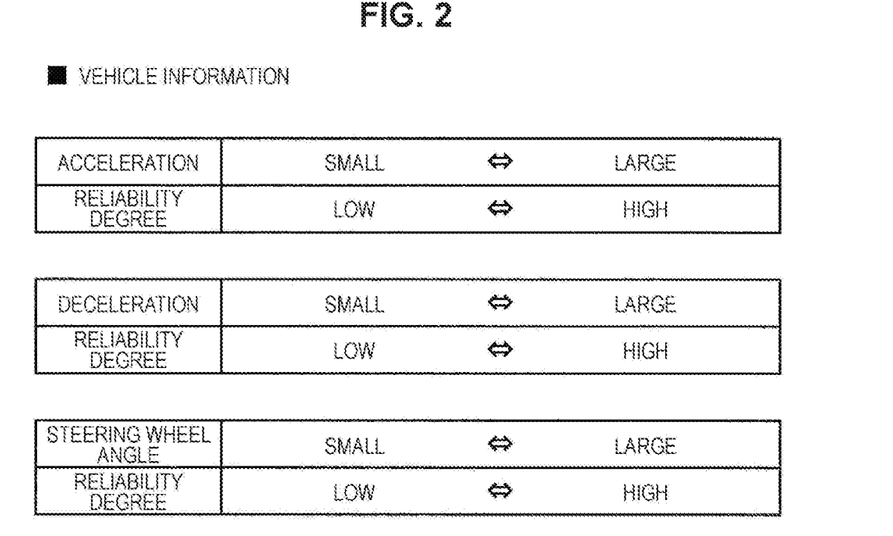
FIG. 2 schematically illustrates a table used to calculate a reliability degree of a first friction coefficient.

The first reliability degree calculator 120 calculates the reliability degree of the first road surface friction coefficient estimated by the first road surface friction coefficient estimator 110. FIG. 2 schematically illustrates a table used to calculate the reliability degree of a first friction coefficient.

As illustrated in FIG. 2, the reliability degree is set for each parameter of the vehicle information. For instance, the reliability degree lowers with a decrease in the value of the acceleration of the vehicle, while the reliability degree rises with an increase in the value of the acceleration. In addition, the reliability degree lowers with a decrease in the value of the deceleration, while the reliability degree rises with an increase in the value of the deceleration. Further, the reliability degree lowers with a decrease in the steering wheel angle, while the reliability degree rises with an increase in the steering wheel angle. As the reliability degree, for instance, a value may be used that is normalized with 0 set as a minimum value and 1 set as a maximum value.

As illustrated in FIG. 2, in estimating a road surface friction coefficient on the basis of the vehicle information, the transient driving state of the vehicle such as accelerating, deceleration, and turning is more suitable to estimate a road surface friction coefficient than the steady driving state such as moving straight at constant speed. The reliability degree of an estimation result is set high in the state such as accelerating, decelerating, and turning which is suitable to estimate a road surface friction coefficient. Conversely, the reliability degree of an estimation result of a road surface friction coefficient is set low in the state such as the vehicle moving straight at constant speed which is not suitable to estimate a road surface friction coefficient.

The first reliability degree calculator 120 calculates the reliability degree of each parameter illustrated in FIG. 2, and sets the maximum value or the average value of the reliability degree as the reliability degree (first reliability degree) of the first road surface friction coefficient.

The communication apparatus 300 receives external information from the external vehicle 500, the server 550 that provides various kinds of information, or the like. The external information acquirer 130 of the road surface friction coefficient estimation apparatus 200 acquires, from the communication apparatus 300, external information necessary to estimate a road surface friction coefficient. Examples of the external information include an estimation result of a road surface friction coefficient of another vehicle, a vehicle behavior of the other vehicle, information (wheel drive type, type of a power unit, and the like) of the other vehicle, various kinds of information indicating a road surface state, and information such as weather and temperature. Examples of the various kinds of information indicating a road surface state include information of a live camera that is installed on a road and images a road surface, and word-of-mouth information. The external information regarding another vehicle is acquirable through communication with the vehicle 500. In addition, the various kinds of information indicating a road surface state, and information such as weather and temperature are acquirable from the server 550.

The second road surface friction coefficient estimator 140 estimates the second road surface friction coefficient on the basis of the external information acquired by the external information acquirer 130. For instance, when the second road surface friction coefficient estimator 140 acquires the road surface friction coefficient estimated by the preceding vehicle 500 on the same road as external information, the second road surface friction coefficient estimator 140 estimates that the road surface of the road that the vehicle equipped with the road surface friction coefficient estimation apparatus 200 is traveling also has substantially the same road surface friction coefficient. More specifically, when positional information of the vehicle 500 traveling the same road is close to positional information of the vehicle equipped with the road surface friction coefficient estimation apparatus 200 which is obtained from the global positioning system (GPS) or the like of the vehicle equipped with the road surface friction coefficient estimation apparatus 200, the road surface friction coefficient acquired from the vehicle 500 is estimated as substantially the same road surface friction coefficient of the road that the vehicle equipped with the road surface friction coefficient estimation apparatus 200 is traveling. The estimated road surface friction coefficient is then set as the second road surface friction coefficient.

In addition, when external information indicating that it is snowing is obtained from external information, the second road surface friction coefficient estimator 140 estimates, as the second road surface friction coefficient, a friction coefficient (e.g., 0.3) obtained when there is snow piled on the road surface. Not only weather information, but information such as temperature and humidity may also be taken into consideration to estimate the second road surface friction coefficient. For instance, the use of a multi-dimensional map that defines the relationship between weather, temperature and humidity, and the second road surface friction coefficient makes it possible to estimate the second road surface friction coefficient on the basis of weather, temperature and humidity.

Figure 3:
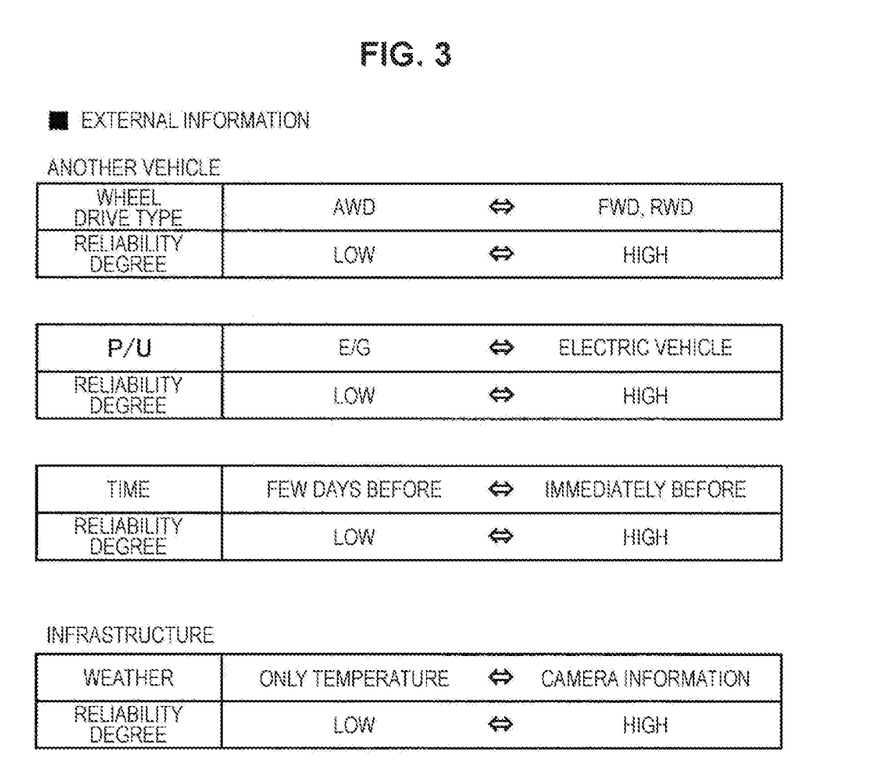
FIG. 3 schematically illustrates a table used to calculate a reliability degree of a second friction coefficient.

The second reliability degree calculator 150 calculates the reliability degree of the second road surface friction coefficient estimated by the second road surface friction coefficient estimator 140. FIG. 3 schematically illustrates a table used to calculate the reliability degree of the second road surface friction coefficient. As illustrated in FIG. 3, the reliability degree is set for each parameter of the external information. For instance, the external information acquired from the external vehicle 500 has a low reliability degree when the wheel drive type of the vehicle 500 is all-wheel drive (AWD). When the wheel drive type of the vehicle 500 is front-wheel drive (FWD) or rear-wheel drive (RWD), the reliability degree is high. When the wheel drive type is AWD, all the wheels concurrently skid in some cases. Accordingly, the reliability degree of estimation of a road surface friction coefficient is low. Meanwhile, when the wheel drive type is FWD or RWD, which entail driven wheels, the reliability degree of estimation of a road surface friction coefficient is high. In addition, the external information acquired from the external vehicle 500 has a low reliability degree if the power unit (P/U) of the vehicle 500 is an engine (E/G), and has a high reliability degree if the power unit is a motor. This is because the motor has higher output torque accuracy than the output torque accuracy of the engine, and the motor has accordingly higher accuracy of estimating a friction coefficient. In addition, external information acquired a few days before has a low reliability degree, while external information acquired immediately before has a high reliability degree. For instance, information acquired from a preceding vehicle that has traveled the road surface, immediately before, on which the vehicle equipped with the road surface friction coefficient estimation apparatus 200 is traveling has a considerably high reliability degree.

In addition, when as infrastructure of external information provided from the server 550, information regarding weather is assumed, information pertaining to only temperature has low reliability and information from a camera such as a live camera has high reliability.

As described above, when a road surface friction coefficient is estimated on the basis of external information, a reliability degree is set in accordance with an information source of the external information and time elapsed from the acquisition of the information. For instance, the reliability degree of a road surface friction coefficient estimated from external information of an FWD electric vehicle or an RWD electric vehicle is high, and the reliability degree of a road surface friction coefficient estimated from information obtained immediately before from a preceding vehicle is high. Meanwhile, the reliability degree of a road surface friction coefficient estimated from information pertaining to only weather or temperature is low.

Here, as the reliability degree, for instance, a value may also be used that is normalized with 0 set as a minimum value and 1 set as a maximum value. The second reliability degree calculator 150 calculates the reliability degree of each parameter illustrated in FIG. 3, and sets the maximum value or the average value of the reliability degree as the reliability degree (second reliability degree) of the second road surface friction coefficient.

The reliability degree comparator 160 compares the first reliability degree with the second reliability degree. The third road surface friction coefficient estimator 170 estimates the final road surface friction coefficient (third road surface friction coefficient) from the first road surface friction coefficient and the second road surface friction coefficient on the basis of a comparison result of the reliability degree comparator 160. Specifically, the third road surface friction coefficient estimator 170 selects the friction coefficient having a higher reliability degree from the first road surface friction coefficient and the second road surface friction coefficient on the basis of a comparison result of the reliability degree comparator 160, and sets a selection result as the third road surface friction coefficient.

When the first road surface friction coefficient and the second road surface friction coefficient are selected, and the third road surface friction coefficient is estimated, the filter processor 180 performs filter processing such as restricting the amount of change to suppress a sharp change at the timing at which the first road surface friction coefficient and the second road surface friction coefficient switch.

Figure 4:
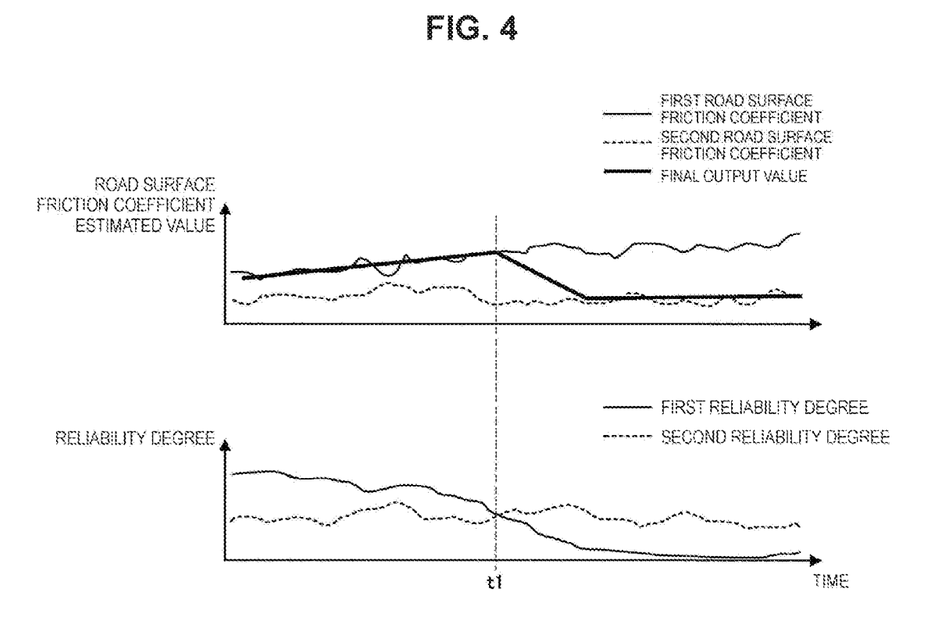
FIG. 4 is a characteristic diagram illustrating that a first road surface friction coefficient estimated by a first road surface friction coefficient estimator, a second road surface friction coefficient estimated by a second road surface friction coefficient estimator, a first reliability degree, and a second reliability degree change with a lapse of time.

FIG. 4 is a characteristic diagram illustrating that the first road surface friction coefficient estimated by the first road surface friction coefficient estimator 110, the second road surface friction coefficient estimated by the second road surface friction coefficient estimator 140, the first reliability degree, and the second reliability degree change with the lapse of time. Note that FIG. 4 illustrates road surface friction coefficients in the characteristics in the upper part, and reliability degrees in the characteristics in lower part.

With reference to the characteristics of the reliability degrees in the lower part of FIG. 4, the first reliability degree is higher than the second reliability degree before time t1, and the second reliability degree is higher than the first reliability degree after the time t1. The third road surface friction coefficient estimator 170 therefore selects the first road surface friction coefficient before the time t1, and the second road surface friction coefficient after the time t1. The third road surface friction coefficient estimator 170 sets the selected road surface friction coefficient as the third road surface friction coefficient.

If the first road surface friction coefficient is switched to the second road surface friction coefficient at the time t1 to output the third road surface friction coefficient as the final output value, the final output value sharply changes at the time t1. The filter processor 180 therefore performs filter processing such as restricting the amount of change as mentioned above. This offers the final output value (third road surface friction coefficient) illustrated in the characteristics in the upper part of FIG. 4.

As described above, comparing the first road surface friction coefficient obtained from the vehicle information with the second road surface friction coefficient obtained from the external information, and switching to an estimation result of the road surface friction coefficient having a higher reliability degree make it possible to estimate a road surface friction coefficient over all the areas during driving with accuracy.

In the vehicle equipped with the road surface friction coefficient estimation apparatus 200, vehicle control is performed on the basis of the final output value of a road surface friction coefficient. For instance, when a road surface friction coefficient is lower than a predetermined value, processing is performed such as switching front and rear torque distribution and switching the wheel drive type of FWD or RWD to the wheel drive type of AWD.

Figure 5:
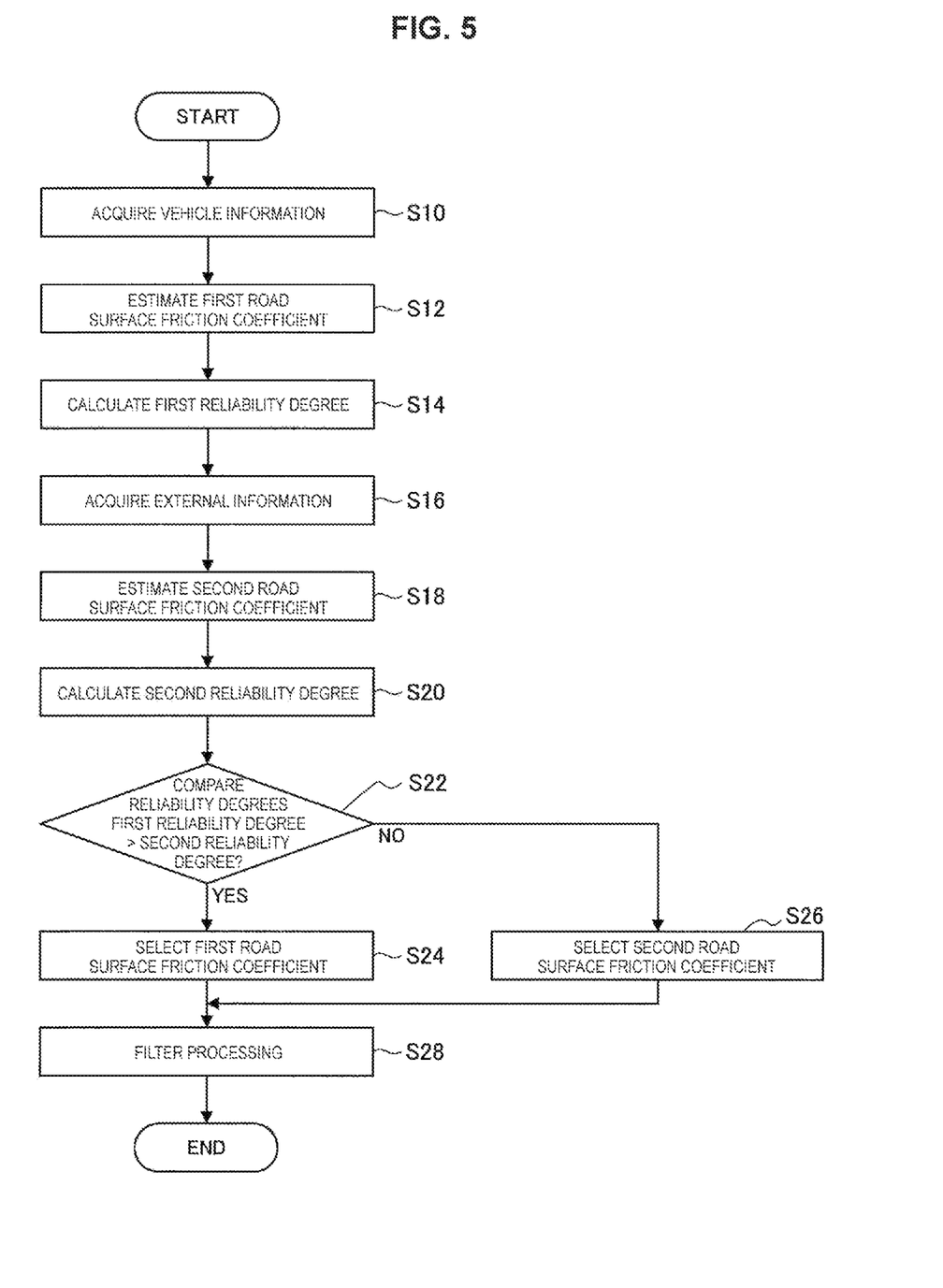
FIG. 5 is a flowchart illustrating processing performed in the road surface friction coefficient estimation apparatus.

Next, on the basis of FIG. 5, processing performed in the road surface friction coefficient estimation apparatus 200 according to the example will be described. FIG. 5 is a flowchart illustrating processing performed in the road surface friction coefficient estimation apparatus 200. First, in step S10, the vehicle information acquirer 100 acquires vehicle information. Next, in step S12, the first road surface friction coefficient estimator 110 estimates the first road surface friction coefficient on the basis of the vehicle information. Next, in step S14, the first reliability degree calculator 120 calculates the reliability degree (first reliability degree) of the first road surface friction coefficient.

Next, in step S16, the external information acquirer 130 acquires external information. Next, in step S18, the second road surface friction coefficient estimator 140 estimates the second road surface friction coefficient on the basis of the external information. Next, in step S20, the second reliability degree calculator 150 calculates the reliability degree (second reliability degree) of the second road surface friction coefficient.

Next, in step S22, the reliability degree comparator 160 compares the magnitude of the first reliability degree with the magnitude of the second reliability degree. If the first reliability degree is greater than the second reliability degree, the flow proceeds to step S24. When the flow proceeds to step S24, the third road surface friction coefficient estimator 170 selects the first road surface friction coefficient as the final road surface friction coefficient.

Meanwhile, if, in step S22, the first reliability degree is not greater than the second reliability degree, the flow proceeds to step S26. When the flow proceeds to step S26, the third road surface friction coefficient estimator 170 selects the second road surface friction coefficient as the final road surface friction coefficient.

After steps S24 and S26, the flow proceeds to step S28. In step S28, the filter processor 180 performs filter processing such as restricting the amount of change at the timing at which the first road surface friction coefficient and the second road surface friction coefficient switch.

As described above, according to the example, the first road surface friction coefficient is estimated from vehicle information. The second road surface friction coefficient is estimated from external information of the outside of the vehicle. On the basis of the reliability degrees of the estimated road surface friction coefficients, the road surface friction coefficient having a higher reliability degree is output as the final estimation result. This makes it possible to estimate a road surface friction coefficient with high accuracy even if it is impossible in the steady driving state or the like to obtain a road surface friction coefficient from vehicle information with accuracy.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A road surface friction coefficient estimation apparatus for a vehicle, the road surface friction coefficient estimation apparatus comprising:
  a processor executing a program to control the vehicle, comprising:
  a first estimator configured to estimate a first road surface friction coefficient on a basis of a vehicle information acquired from the vehicle;
  a second estimator configured to estimate a second road surface friction coefficient on a basis of an external information acquired from outside of the vehicle; and
  a third estimator configured to estimate a final road surface friction coefficient from a selection of a highest reliability at a predetermined time from among the first road surface friction coefficient and the second road surface friction coefficient on a basis of a comparison result between a first reliability degree and a second reliability degree, the first reliability degree indicating a reliability of the first road surface friction coefficient, the second reliability degree indicating a reliability of the second road surface friction coefficient,
  wherein the vehicle is controlled by the third estimator with the estimate of the final road surface friction coefficient.

2. The road surface friction coefficient estimation apparatus for a vehicle according to claim 1, comprising:
  a first reliability degree calculator configured to calculate the first reliability degree at the predetermined time; and
  a second reliability degree calculator configured to calculate the second reliability degree at the predetermined time, wherein
  the first reliability degree calculator calculates the first reliability degree on a basis of a driving state of the vehicle such that the first reliability degree is higher in a transient driving state than in a steady driving state.

3. The road surface friction coefficient estimation apparatus for a vehicle according to claim 2, wherein
  the first reliability degree calculator calculates the first reliability degree such that the first reliability degree is higher with an increase in an acceleration of the vehicle.

4. The road surface friction coefficient estimation apparatus for a vehicle according to claim 2, wherein
  the first reliability degree calculator calculates the first reliability degree such that the first reliability degree is higher with an increase in a deceleration of the vehicle.

5. The road surface friction coefficient estimation apparatus for a vehicle according to claim 2, wherein
  the first reliability degree calculator calculates the first reliability degree such that the first reliability degree is higher with an increase in a steering wheel angle of the vehicle.

6. The road surface friction coefficient estimation apparatus for a vehicle according to claim 1, wherein
  the external information is acquired from another vehicle.

7. The road surface friction coefficient estimation apparatus for a vehicle according to claim 1, comprising:
a second reliability degree calculator configured to calculate the second reliability degree.

8. The road surface friction coefficient estimation apparatus for a vehicle according to claim 7, wherein
the second estimator estimates the second road surface friction coefficient on a basis of the external information acquired from the other vehicle, and
the second reliability degree calculator calculates the second reliability degree on a basis of a wheel drive type or a type of a power unit of the other vehicle.

9. The road surface friction coefficient estimation apparatus for a vehicle according to claim 8, wherein
when the wheel drive type is a front-wheel drive or a rear-wheel drive, the second reliability degree calculator calculates the second reliability degree such that the second reliability degree is higher than the second reliability degree obtained when the wheel drive type is an all-wheel drive.

10. The road surface friction coefficient estimation apparatus for a vehicle according to claim 8, wherein
when the type of the power unit is a motor, the second reliability degree calculator calculates the second reliability degree such that the second reliability degree is higher than the second reliability degree obtained when the type of the power unit is an engine.

11. The road surface friction coefficient estimation apparatus for a vehicle according to claim 7, wherein
the second estimator estimates the second road surface friction coefficient on a basis of the external information regarding weather, and
the second reliability degree calculator calculates the second reliability degree in accordance with a reliability degree of information regarding the weather.

12. The road surface friction coefficient estimation apparatus for a vehicle according to claim 1, wherein the third estimator adopts among the first and second road surface friction coefficient having a higher reliability degree as an estimation result of the final road surface friction coefficient.

13. The road surface friction coefficient estimation apparatus for a vehicle according to claim 1, wherein
the second estimator estimates the second road surface friction coefficient on a basis of the external information acquired from another vehicle.

14. A road surface friction coefficient estimation method for a vehicle, the road surface friction coefficient estimation method comprising:
estimating a first road surface friction coefficient on a basis of a vehicle information acquired from the vehicle; estimating a second road surface friction coefficient on a basis of an external information acquired from outside of the vehicle; and
estimating a final road surface friction coefficient from a selection of a highest reliability at a predetermined time from among the first road surface friction coefficient and the second road surface friction coefficient on a basis of a comparison result between a first reliability degree and a second reliability degree to control the vehicle, the first reliability degree indicating a reliability of the first road surface friction coefficient, the second reliability degree indicating a reliability of the second road surface friction coefficient,
wherein the vehicle is controlled with the estimate of the final road surface friction coefficient.

15. The road surface friction coefficient estimation method according to claim 14, wherein
the second road surface friction coefficient is estimated on a basis of the external information acquired from another vehicle, and
the second reliability degree is calculated on a basis of a wheel drive type or a type of a power unit of the other vehicle.

16. The road surface friction coefficient estimation method according to claim 14, wherein the estimate of the final road surface friction coefficient is selected from among the first and second road surface friction coefficients having a higher reliability degree.

17. A road surface friction coefficient estimation apparatus for a vehicle, the road surface friction coefficient estimation apparatus comprising:
circuitry configured to:
estimate a first road surface friction coefficient on a basis of a vehicle information acquired from the vehicle;
estimate a second road surface friction coefficient on a basis of an external information acquired from outside of the vehicle; and
estimate a final road surface friction coefficient from a selection of a highest reliability at a predetermined time from among the first road surface friction coefficient and the second road surface friction coefficient on a basis of a comparison result between a first reliability degree and a second reliability degree, the first reliability degree indicating a reliability of the first road surface friction coefficient, the second reliability degree indicating a reliability of the second road surface friction coefficient,
wherein the vehicle is controlled by the third estimator with the estimate of the final road surface friction coefficient.

18. The road surface friction coefficient estimation apparatus according to claim 17, wherein the circuitry is further configured to:
estimate the second road surface friction coefficient on a basis of the external information acquired from another vehicle, and
calculate the second reliability degree on a basis of a wheel drive type or a type of a power unit of the other vehicle.

19. The road surface friction coefficient estimation apparatus according to claim 17, wherein the estimate of the final road surface friction coefficient is selected from among the first and second road surface friction coefficients having a higher reliability degree by the circuitry,
wherein the circuitry includes a central processing unit.

20. The road surface friction coefficient estimation apparatus according to claim 17, wherein the circuitry includes:
a circuit hardware to estimate the first road surface friction coefficient on the basis of a vehicle information acquired from the vehicle;
a circuit hardware to estimate a second road surface friction coefficient on a basis of the external information acquired from the outside of the vehicle; and
a circuit hardware to estimate a final road surface friction coefficient from the first road surface friction coefficient and the second road surface friction coefficient on the basis of a result of the comparison between the first reliability degree and the second reliability degree, the first reliability degree indicating the reliability of the first road surface friction coefficient, the second reliability degree indicating the reliability of the second road surface friction coefficient.

* * * * *